Aug. 6, 1940.   P. DE LACY-MULHALL   2,209,961
SYSTEM FOR IRRIGATION
Original Filed Nov. 3, 1934   4 Sheets-Sheet 3

INVENTOR
Patrick De Lacy-Mulhall
BY John Flam
ATTORNEY

Patented Aug. 6, 1940

2,209,961

UNITED STATES PATENT OFFICE 2,209,961

SYSTEM FOR IRRIGATION

Patrick De Lacy-Mulhall, Los Angeles, Calif., assignor to Katherine De Lacy-Mulhall, widow of Patrick De Lacy-Mulhall, deceased, by court order and decree Application November 3, 1934, Serial No. 751,402
Renewed April 19, 1938

14 Claims. (Cl. 299—67)

This invention relates to a system for periodically discharging a desired quantity of liquid, such as water for irrigation purposes.

More particularly, the system contemplates the provision of a number of outlet sprinkler heads, together with controls so arranged that these heads are operated in succession. In some instances, before the last of the series of discharging stations has completed its period of activity, a new cycle of operations can be automatically started, to cause all of the discharge sprinklers to be again operated in sequence and in the same order.

It is one of the objects of this invention to provide a system of this character that is simple and reliable in operation.

Such systems are useful for example, in watering golf courses. In such cases, the sprinkler heads are preferably made rotary, so as to spread the water over a circle defined by the trajectory of the stream. It is another object of this invention to make it possible to increase the trajectory of the stream, without the necessity of any added elements.

It is still another object of the invention to make it possible to reciprocate the sprinkler head back and forth over an arc, by the aid of a simple and inexpensive mechanism.

It is still another object of this invention to utilize the pressure of the water for opening and closing the sprinkler heads in succession.

It is still another object of the invention to connect the sprinkler heads in sequence in such manner that they are automatically operated in sequence, the succeeding head being opened as soon as the preceding head has completed its period of delivery.

This invention possesses many other advantages, and has other objects which may be made more easily apparent from a consideration of several embodiments of the invention. For this purpose there are shown several forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings.

Figure 17:
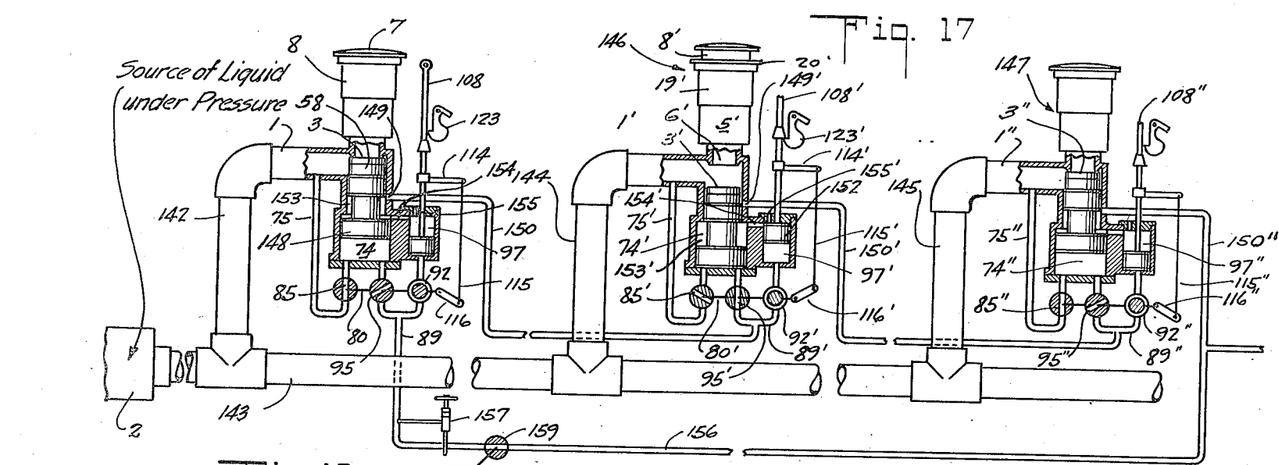
Fig. 17 is a diagrammatic view showing the layout of a system utilizing a plurality of sprinkler heads supplied with water from a common source.

In Figs. 1 to 12 inclusive, one form of the sprinkler head is shown as utilized in the distribution system. Thus a conduit 1 is arranged, as illustrated in Fig. 17, to be connected to a source 2 of liquid under pressure. This liquid is water when the system is used for irrigation purposes. The sprinkler head is so arranged that the passage of water from conduit 1 is controlled by a valve closure 3. This valve closure cooperates with a rounded valve seat 4 arranged in the bottom of a casing 5. The water after it passes through the cylindrical opening 6 controlled by the valve closure 3, finally emerges into the sprinkler head body 8. This body 8 is shown as cylindrical and hollow. The top 7 of the sprinkler head is provided with one or more nozzles 11 and 12. These nozzles have passageways 9 and 10, having axes directed above the horizontal, so as to provide a proper trajectory for the stream ejected from these members 11 and 12. They can conveniently be fastened in place from the inside of the top portion 7, since this top portion 7 is releasably connected to the hollow body 8, as by the aid of the threaded portion 13.

Figure 1:
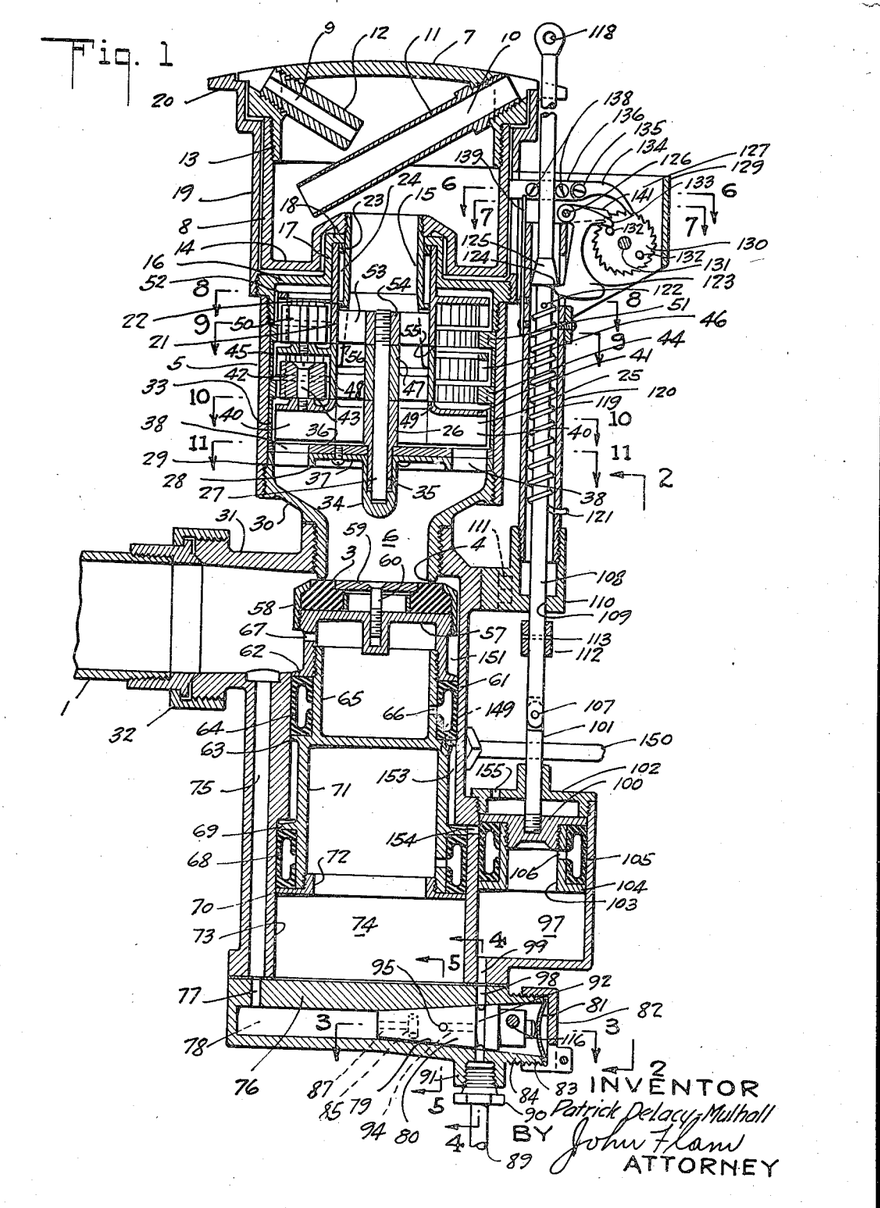
Figure 1 is a longitudinal sectional view of a sprinkler head and its valve control mechanism, incorporating the invention.

The hollow body 8 is formed with an annular bottom flange 14, as well as a downwardly directed central sleeve 15 through which the water enters into the body 8. The central sleeve 15 is preferably mounted for rotation in the top cover 16 of the casing 5. For this purpose the top cover 16 can be provided with a vertical extension 17, and an apertured top flange 18 through which the sleeve 15 extends.

In order to form a protecting apron around the sprinkler head, a tubular extension 19 is provided, fastened as by threads at its lower end to the exterior of the cover 16. This apron 19 can be provided with an appropriate upper flange 20 arranged to be flush with the top 7 of the sprinkler when the sprinkler is in the retracted position shown in Fig. 1.

The sprinkler head can, if desired, be urged upwardly by the pressure of the water passing through the aperture 6 into the mechanism. In this way it is possible, while the sprinkler is inactive, to have it lowered below the turf if the sprinkler is used on a golf course or similar grounds; and to rise or "pop up" in order to clear the grass when it is in use. To permit this rise, the sleeve 15 is further guided within a sleeve or hub 21, as by the aid of a lower flange 22 extending around the bottom edge of the sleeve 15. A sealing washer 23 can be placed inside the annular space 24 between members 15 and 21. This washer 23 is restrained against removal by the top flange 18 of the extension 17. The washer 23 can be assembled inside of sleeve member 21 prior to the joining of sleeve 15 in the bottom of the sprinkler head 8. The water acts against the flange 22 to raise it so that the entire sprinkler head is elevated and within the limits prescribed by the flange 18.

Furthermore, a mechanism is provided for rotating the entire sprinkler head when water enters through the aperture 6. For this purpose the water serves to rotate a bucket wheel 25. This bucket wheel is shown most clearly in Fig. 10. It is joined to a hub 26 rotatably mounted upon a vertical stub shaft 27 extending through the hub 26. The bucket wheel is geared to the sprinkler head 8 for driving it in a manner to be hereinafter described. Water is fed in the proper direction to actuate bucket wheel 25 by the provision of a nozzle structure or wheel 28, shown in detail in Figs. 11 and 12. This nozzle structure is held tightly against rotation within the casing 5, and is urged against a shoulder 29 provided by a fitting 30. This fitting 30 is formed integrally with the valve seat member 4, and is threaded into conduit 31. This conduit 31 in turn is joined in fluid tight relationship with the conduit 1 by the aid of an appropriate coupling structure 32.

Figure 11:
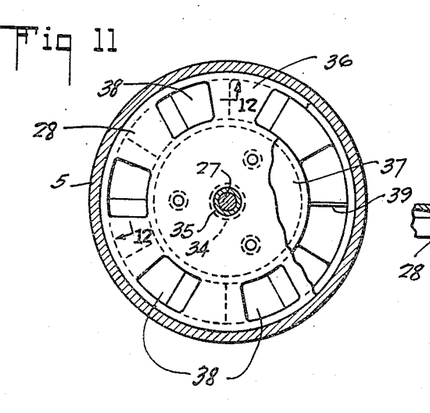
Fig. 11 is a sectional view, taken along the plane 11—11 of Fig. 1, and with some of the parts broken away.
Figure 12:
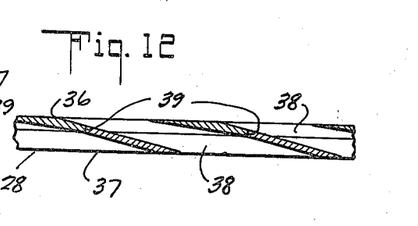
Fig. 12 is an enlarged detail developed sectional view of the nozzle wheel, shown in Fig. 11.

The nozzle member 28 is confined against shoulder 29 by spacer ring 33 placed above it. This ring can be a split resilient band frictionally engaging the interior of casing 5. Furthermore, this nozzle structure includes a downwardly extending socket member 34 in which the extension 35 of bucket wheel 25 is rotatable. The shaft 27 is also supported within the downwardly extending portion 34.

The nozzle member 28 is shown in this instance as having an upper and lower portion 36 and 37 respectively, defining in this instance six nozzle openings 38 having an axis oblique to the top surface of the nozzle structure 28. The nozzle structure 28 is made in two parts, so that it may be formed of appropriate castings, and to make it possible to remove the cores required to form the nozzle apertures 38. Furthermore, the planes of division 39 between the upper and lower plates 36 and 37 around the nozzle apertures 38, are substantially transverse to the axes of the apertures so that accurate abutting surfaces can be formed between the two plates 36 and 37 around these apertures.

It is apparent that water passing through aperture 6 emerges above the nozzle structure 28 adjacent the periphery of this nozzle structure 15 and acts to rotate the wheel 25 by pressure against the buckets 40. This motion is reduced so as to impart a comparatively slow rate of rotation of sprinkler head 8, as by the use of planetary gearing.

For example, the bucket wheel 25 can be provided with an upper flange 41. This flange can carry a planetary pinion 42 on a stub shaft 43. This planetary pinion 42, at its lower portion, acts on a stationary internally toothed wheel 44 whereby a positive rotation of pinion 42 is obtained. This wheel 44 is held firmly against rotation between spacer rings 33 and 45 in contact with the interior cylindrical surface of casing 5. The upper portion of pinion 42 meshes with a rotatable internal gear wheel 46. This gear wheel has a different number of teeth than the stationary wheel 44. For example, if gear wheel 44 has thirty-one teeth and gear wheel 46 has thirty-two teeth, it is obvious that bucket wheel 25 must rotate thirty-two times in order to drive wheel 46 through one revolution.

The wheel 46 is provided with a hub 47 as well as a sleeve 48 which extends downwardly to rest upon an annular shoulder 49, formed as a boss on the top flange 41 of bucket wheel 25. Hub 47 is freely rotatable on post 27.

In order further to reduce the speed of the said system, a planetary gearing is provided between wheel 46 and sleeve 15. Thus wheel 46 can support a planetary pinion 50 freely rotatable on a stationary stub shaft in a manner entirely similar to the support of the planetary pinion 42. The lower portion of this planetary pinion meshes with a stationary internal gear 51 shown in this instance as urged against the spacer ring 45. The upper portion of the planetary pinion 50 meshes with a wheel 52. In this case also, the ratio of reduction may be of the order of one to thirty-two. The wheel 52 is arranged to be placed in driving relation with respect to the sleeve 15, as by the aid of a yoke or spokes 53 joined to the hub 54. In this hub the shaft 27 can be threaded, so that this shaft is rotated by wheel 52. All of the hubs 54, 47 and 26 are arranged one above the other. The sleeve 21 is shown as joined to the top flange 55 of wheel 52, and is rotatable within the extension 17. The sleeve 15 is provided with slotted arms 56 through which the yoke 53 passes, thereby providing a driving connection to sleeve 15 for either the retracted position shown, or the upwardly projected position of the head 8.

It should also be noted that the sleeves 21, 48 and boss 49 form a continuous central opening for the egress of water from the bucket wheel 25 into and through the interior of sleeve 15. Also, the top flanges, such as 41 and 55, for the gears, further retard escape of water outside of the central opening formed by members 49, 48 and 21. The edge of bucket wheel 35, as indicated in Fig. 1, runs quite closely to the sleeve 33. In this way, only very narrow passages are provided for entry of water into the space occupied by the reduction gears. And of course, the members 21, 48 and 49 form a complete closure against entry of water from the sleeve 15. Accordingly, the opportunity for any clogging of the gears by foreign particles such as sand, is slight; and there is no need to interpose any filtering screen in the water passages. Such screen would introduce an undesirable resistance to the water flow.

It is apparent from the foregoing description that the pressure and the velocity of water serve to rotate the sprinkler head 8, and to project it upwardly above the apron 19. There is furthermore another effect which is of considerable importance. The velocity of flow through the passage 6 and the sleeve 15 is much greater than the velocity of flow within the hollow head 8, because the cross section area of this head is much greater than that of the passage 6; and the combined areas of nozzles 9 and 10 are much less than the area of the passage 6. The result is that there is an increase in pressure within the head 8. This is apparent from a consideration of Bernoulli's theorem, regarding the conservation of energy in a moving stream of liquid. Accordingly, the trajectory of the jets through passageways 9 and 10 is materially increased, due to this increased pressure; and this effect is made a maximum upon proper choice of ratios of the combined nozzle openings, the area of head 8, and the area of passage 6. Also, the sleeve 15 has its lower entry opening tapered so as to form a restricted exit for the water into bowl 8. This produces a Venturi effect and assists in the improvement in the trajectory.

The valve closure 3 is shown as formed of a yielding member, such as rubber, held over a head 57 as by the aid of a cup 58 threaded over the head 57. In order further to maintain the valve closure 3 in place, a plate 59 can be placed in the center of the closure member 3 and held in place with respect to the head 57 as by the aid of a flat headed screw 60.

To open and close the valve, utilization is made of fluid pressure. For this purpose the head 57 forms one part of a fluid piston operating in a cylinder 61. Thus the bottom of the head 57 forms a shoulder 62 serving to cooperate with an opposite shoulder 63 to confine an expansible hollow yielding piston ring 64. The shoulder 63 is shown as formed integral with a piston structure including the cylindrical extension 65 threaded within the head 57. The piston ring 64 can be made of rubber or other yielding material and can be placed in communication with the interior of cylindrical extension 65 as by the aid of the radial apertures 66 in said member 65. Fluid pressure is permitted to enter the hollow member 65 as by the aid of a passageway 67 leading to the interior of conduit 31 and inwardly to the space defined by the structure 65 and head 57. This fluid pressure serves to expand the ring 64 against the walls of cylinder 61, rendering the piston structure fluid tight.

A larger piston structure is shown as integrally connected with the structure 65—57. This larger piston structure is formed by the piston ring 68, operating just as ring 64, and confined between a shoulder 69 and a flange 70. The shoulder 69 is shown as formed externally of the sleeve 71 depending from the piston structure 65—57; and the flange 70 is shown as fastened as by the threaded extension 72, inside of the depending sleeve 71. This larger piston structure is adapted to cooperate inside of a cylinder 74, having a wall 73. It is apparent that if liquid under pressure be admitted underneath the piston structure from conduit 31, the valve closure 3 will be urged upwardly by fluid pressure against its seat 4 and the valve closes. This is due to the fact that there is a greater area subjected to the liquid pressure acting upwardly on the associated piston structures, than the area around the closure member 3, subjected to liquid pressure acting downwardly and tending to open the valve.

It is thus apparent that in order to close the valve, it is merely necessary to exert fluid pressure in chamber 74; and in order to open the valve it is necessary to relieve the pressure therein. When the pressure is so relieved, the fluid pressure from conduit 31 is effective on an annular surface around closure 3 to urge the closure downwardly.

In order to provide the necessary fluid pressure for holding the valve structure closed, an upright passageway 75 extends downwardly from conduit 31 and can pass into a recess 78 in cylinder head 76 by way of an aperture 77. This recess is provided with a tapered aperture 79, in which is a rotatable control taper valve plug 80. This valve plug is urged in fluid tight relationship with the aperture 79, as by a spring disc 81 confined by a cap 82 against the threaded end 83 of a boss 84. This boss 84 extends radially from the cylinder head 76. In the position shown in Figs. 1 and 3, the passage of liquid through passageway 75 is interrupted, since the port 85 is out of alinement with the horizontal passageway 86 formed in the boss that accommodates plug 80. This horizontal passageway 86 communicates at each end with vertical passageways 88, extending upwardly into the cylinder chamber 74. The passageway 85 is connected as by a horizontal axial recess 87 with the passage 78. Thus when plug 80 is rotated to aline port 85 with the transverse passageway 86, liquid under pressure can pass through apertures 85, 86, 87 and 88 into the chamber 74.

For the position of the plug 80 shown in Figs. 1, 3, 4, and 5, the interior of chamber 74 is connected to a conduit 89. Conduit 89 is shown as connected to a threaded connection nipple 90 threaded into a boss 91 extending from the cover 76. The interior of this boss 91 in turn is connected with the annular groove 92, disposed around the tapered plug 80. This annular groove 92 is thus in continuous connection with the conduit 89. A through port 93 is provided for forming a connection between this annular groove 92 and an axial aperture 94. This axial aperture is in turn in communication with a transverse port 95 formed in plug 80. This transverse port 95 (Fig. 5) is shown as alined with the horizontal passageway 96 in cover 76. This passageway is in communication with the upright passageway 88. Thus the cylinder space 74 is in communication with the conduit 89 by way of passageway 88, passageway 96, port 95, axial passageway 94, port 93, and annular recess 92.

Figures 5, 6, 7, 16:
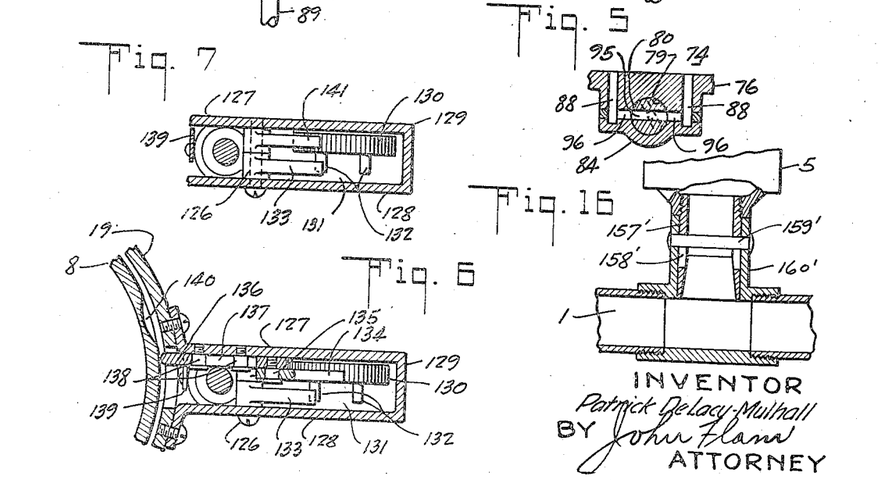
Fig. 5 is a detail sectional view, taken along the plane 5—5 of Fig. 1.
Fig. 6 is a sectional view, taken along the plane 6—6 of Fig. 1.
Fig. 7 is a detail sectional view, taken along the plane 7—7 of Fig. 1.
Fig. 16 is a detailed section of another modification of the invention.
Figures 8, 9, 10, 15:
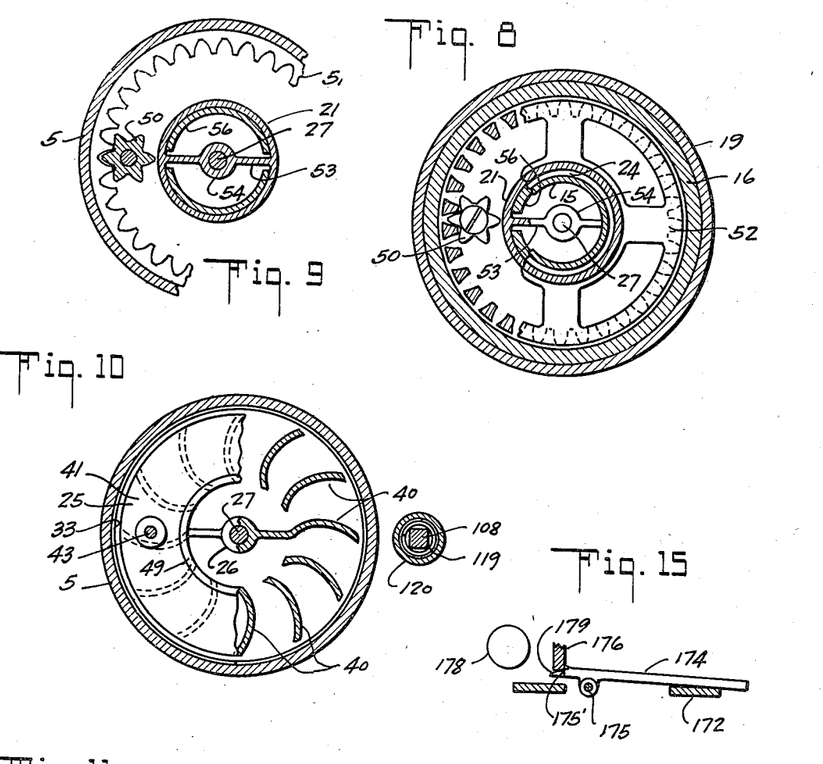
Fig. 8 is a sectional view, taken along the plane 8—8 of Fig. 1.
Fig. 9 is a fragmentary sectional view, taken along the plane 9—9 of Fig. 1.
Fig. 10 is a sectional view, taken along the plane 10—10 of Fig. 1.
Fig. 15 is a detail sectional view, taken along the plane 15—15 of Fig. 14 and shown as developed in a plane.

It is furthermore apparent that when tapered plug 80 is rotated in a counterclockwise direction as viewed in Fig. 5, the port 95 can be placed out of alinement with passageway 96, thereby interrupting this communication; and at the same time port 85 can be alined with passageway 86 to provide communication from the passageway 75 into the cylinder space 74.

The conduit 89 is furthermore in continual communication with a control cylinder 97, as by the aid of the aperture 98 in cover 76, and the aperture 99 in the bottom of the cylinder 97. Aperture 98 is in continuous communication with the annular space 92 of the tapered plug 80.

In order to open the valve closure 3, the plug 80 must be rotated to the position shown in Fig. 1. In this position the liquid pressure from conduit 31 is no longer effective to urge the pistons connected to the closure 3 upwardly. However, fluid pressure may yet be active through conduit 89, recess 92, port 93, aperture 94, port 95, and passageway 88, to hold the valve closed. As soon as fluid pressure in conduit 89 is released, however, the fluid pressure in conduit 31 is effective to urge the closure 3 downwardly and the valve opens. The fluid pressure conditions existing in conduit 89 can be made dependent upon the position of a preceding sprinkler head valve in the system. This pressure can thus be maintained until the preceding valve closes; and immediately thereafter the pressure is released and the valve closure 3 can move downwardly. The manner in which this pressure is controlled in conduit 89 will be described hereinafter.

The control cylinder 97 is adapted to control the position of taper plug 80 so that these fluid pressures can be effective to cause the valve to open or close. Operating in cylinder 97 is the control piston, including the piston head 100 having a rod 101. This rod is guided for vertical movement in the cylinder head 102. The piston head 100 is threaded into a flanged sleeve 103 having a horizontal flange 104. Between head 100 and flange 104 an expansible piston ring 105 can be confined, subjected at its interior to the pressure existing in chamber 97. This is accomplished by the aid of a radial aperture 106.

Figures 2, 3, 4:
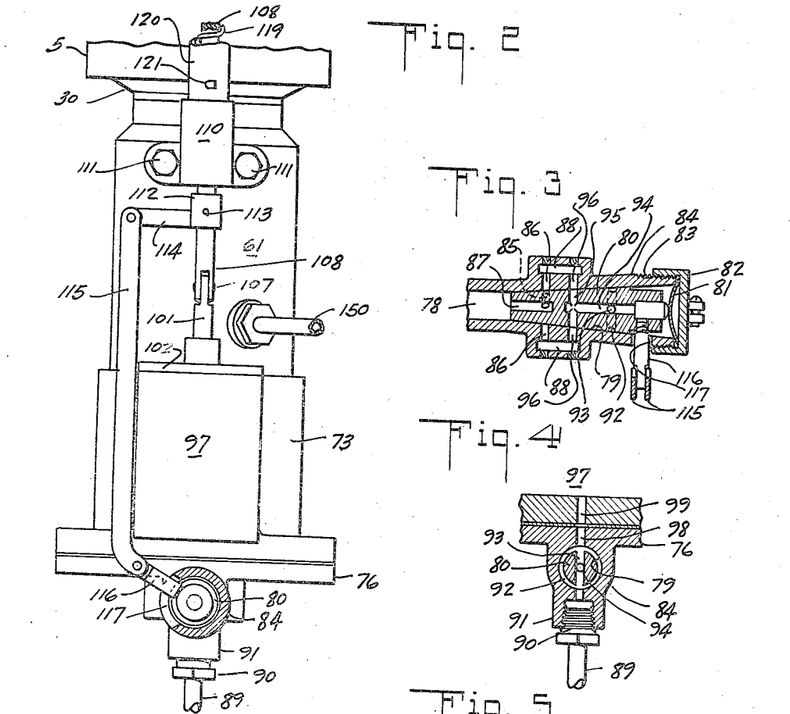
Fig. 2 is a fragmentary elevation of the sprinkler apparatus shown in Fig. 1, showing the valve part thereof, and with some of the parts in section.
Fig. 3 is a detail sectional view, taken along the plane 3—3 of Fig. 1.
Fig. 4 is a detail sectional view, taken along the plane 4—4 of Fig. 1.

Joined to the rod 101 as by the aid of a pin 107 is a square rod 108. This square rod is guided in a square aperture 109 of a bracket 110. This bracket 110 is shown as fastened to the exterior of the valve body as by bolts 111 (Fig. 2). By the aid of a system of links and levers, square rod 108 is joined to the plug 80 for rotating it. Thus carried by the rod 108 is a collar 112, fastened to the rod 108, as by a through pin 113. A horizontal extension 114 is supported on collar 112 and is pivotally joined to a link 115. This link in turn is pivoted to arm 116 joined to plug 80. Rotation of plug 80 by movement of link 115 is permitted by the provision of a slot 117 in the boss 84.

It is apparent that when the rod 108 moves upwardly to the position shown in Fig. 2, the plug 80 is rotated in a clockwise direction. A corresponding downward movement of rod 108 causes a counterclockwise rotation of the plug 80, to place cylinder 74 into communication with conduit 31, and to interrupt communication from cylinder space 74 to conduit 89.

The upward movement of the piston structure 100—103 is obtained by liquid pressure entering cylinder 97 from conduit 89; or alternatively an upward mechanical force can be utilized to pull rod 108. For this purpose rod 108 may be provided with an eye end 118. A tension spring 119 however, tends to pull the rod 108 downwardly. For this purpose the spring 119 is disposed around the rod 108 and is enclosed in a hollow pipe-like member 120. This member 120 forms virtually an extension of the guide member 110. Lower end 121 of spring 119 is anchored into the member 120. The upper end is anchored as shown at 122 to the rod 108.

When the rod 108 is pulled upwardly to the position shown, it is latched in that position until it is subsequently unlatched. For this purpose, a weighted catch 123 is provided, adapted to engage underneath the shoulder 124 provided on a tapered collar 125 on rod 108. This latch 123 is pivoted adjacent its upper end on a pin 126. This pin 126 is supported on opposite walls 127 and 128 of a U-shaped housing 129 fastened to the exterior of apron 19.

While the rod 108 is held in the elevated position shown, fluid pressure is prevented from entering cylinder 74 through passage 75. However, after a certain number of revolutions of the sprinkler head 8, the latch 123 is released and spring 119 serves to return the piston structure 100—103 to its lowermost position, and fluid pressure is then available to close the valve.

This release mechanism is illustrated most clearly in Figs. 1, 6 and 7. Thus a ratchet wheel 130 is provided, freely rotatable on a pin 131, passed transversely across the U-shaped extension 129. This ratchet wheel 130 carries one or more pins such as 132, which upon a sufficient rotation of wheel 130, acts to lift the arm 133 of the latch 123, thereby freeing rod 108. Advancement of ratchet wheel 130 is provided by an advancing pawl 134. This advancing pawl is pivoted by the aid of a screw 135 on a slidable bar 136. Bar 136 is guided for sliding movement by the aid of a slot 137 in which are disposed a pair of stationary guide screws 138. The inner end of the sliding bar 136 is held against the outer surface of the rotating sprinkler head body 8 as by a flat leaf spring 139. The body 8, as shown most clearly in Fig. 6, is provided with an exterior depression 140. As the depression 140 passes the inner end of sliding bar 136, the spring 139 is permitted to pull the sliding bar 136 to the left; and as the depression 140 passes the bar 136, this bar 136 is urged to the right, causing advancement of the ratchet wheel 130. It is apparent that after a certain number of reciprocations of the bar 136 one of the pins 132 will serve to free the rod 108.

To prevent reverse rotation of ratchet wheel 130, a holding pawl 141 can be provided on pin 126.

By referring to Figs. 1 and 17, the manner in which the sprinkler heads are operated in sequence can now be described. In Fig. 17 it is seen that conduit 1 can be joined as by an upright pipe 142 to a common header 143. Disposed along the header 143, which can run underground, is a number of upright pipes 144, 145, etc. for conducting liquid under pressure to a number of sprinkler head stations 8, 146, 147, etc. The mechanism operating each of the sprinkler heads is indicated in a diagrammatic fashion. The sprinkler head 8 is shown as inactive, and the sprinkler head at station 146 is indicated as open, succeeding stations being closed.

Let us assume that sprinkler head 8 is in the closed position and that it is desired to start its operation. In the closed position, liquid pressure is effective in cylinder chamber 74 to urge the piston structure (labeled as 148 in Fig. 17) upwardly. For the present, it may be assumed that conduit 89 is vented to atmosphere. The sprinkler head 8 can thus be made active by pulling upwardly on rod 108, causing catch 123 to hold this rod in its upper position, as indicated in Fig. 1. The upward movement of the rod 108 causes the plug 80 to be rotated, and the passage of fluid through passageway 75 is interrupted. The fluid pressure in chamber 74 is relieved through port 95 and conduit 89. The valve closure 3 therefore opens, and sprinkler head 8 becomes active. It rises and rotates as described heretofore.

As soon as piston structure 148 lowers to the position illustrated for example at the station 146, liquid under pressure can pass from conduit 1 downwardly around the cap 58, and into a port 149 disposed in the side of the cylinder chamber. This liquid under pressure passes through a "stepper" conduit 150. This liquid connection is not established, however, until the annular space 151 (Fig. 1) underneath the cap 58 is opposite the port 149.

The fluid pressure in the stepper conduit 150 is effective at station 146 to raise a piston structure 152 corresponding to piston structure 100—103 of Fig. 1. At this station the plug 80' is controlled in the same way as plug 80, the corresponding reference numerals being primed to indicate the corresponding parts at station 146. The liquid pressure from stepper conduit 150 passes around the plug 80' in the annular passageway 92' and into the cylinder space 97', causing the piston 152 to raise and to be held in the position indicated in Fig. 17. At the same time, port 85' is placed out of communication with cylinder space 74'. However, at this stage valve closure 3' is not lowered, because fluid pressure through stepper conduit 150 is still effective through port 95' to maintain a closing pressure in cylinder 74'. The valve closure 3' opens, however, as soon as sprinkler head 8 returns to inactive position. This occurs as stated before, after a certain number of revolutions of the sprinkler head. The piston structure 100—103 then returns to the position shown in Fig. 17, and there is an interruption in the supply of liquid under pressure to the stepper conduit 150. Instead the stepper conduit 150 is open to atmosphere through port 149, annular passageway 153, port 154, cylinder chamber 97, and a port 155 through cap 102. Accordingly, the closure 3' is depressed by liquid pressure in conduit 1' and station 146 becomes active. This condition is illustrated in Fig. 17.

As soon as station 146 becomes active, a stepper conduit 150' is supplied with liquid under pressure to prepare for the opening operation of valve closure 3'' at station 147. The manner in which this valve closure is operated is the same as mentioned heretofore in connection with valve closures 3 and 3'.

The sprinkler head at station 146, after being active for a definite period, releases the rod 108', causing a rotation of taper plug 80' and liquid pressure is then effective to close closure 3' through passageway 75'. The station 146 then returns to the position illustrated at the sprinkler head 8. As soon as this occurs, liquid pressure is relieved in stepper conduit 150', and station 147 becomes operative.

As many stations in succession as desired can be operated in the manner described. It is possible to restart the cycle before one cycle is fully completed. This can easily be effected by providing a branch line to any of the stepper conduits, leading back to the first sprinkler head 8. In the form shown in Fig. 17, the station 147 has its stepper conduit 150'' provided with a by-pass stepper 156 leading back to conduit 89 of the first sprinkler head 7. Station 147 may be any one of the stations succeeding sprinkler head 8.

When such a station succeeding station 147 is operated, sprinkler head 8 is simultaneously operated, as heretofore described, and a new cycle or wave of operations begins. This new cycle, when it reaches the station 147 causes a third cycle to be started. This series can become effective for as long as desired; but a limit may be placed thereon as by the aid of a needle valve 10 mechanism 157 in conduit 156, discharging into a tilting measuring bucket 158. This bucket, when sufficiently loaded, tilts and operates a valve 159 in conduit 156, to interrupt communication from stepper conduit 150'' to the first station. This interruption is effective only after the bucket 158 is loaded sufficiently; and by a proper degree of opening of needle valve 157 this can be effective only after a certain number of cycles of operations of the sprinkler head 7.

Although manual means for starting the first valve is indicated, it is apparent that the rod 108 can be arranged to be operated automatically in response to definite conditions, such as humidity and temperature.

In the form shown in Fig. 1, the popping up of the sprinkler head 8 is provided for with respect to the stationary casing 5. In the form shown in Fig. 16, the entire casing 5 can be raised by fluid pressure in conduit 1 instead of merely the head 7. This is accomplished by providing casing 5 with a downwardly extending telescoping sleeve 157' slotted as indicated at 158' for the accommodation of a guide pin 159'. This guide pin 159' extends through the upwardly directed branch 160' of conduit 1 on which head 5 is accommodated. It is apparent that liquid pressure in conduit 1 will act on the bottom lower surface of the sleeve 157' to raise it, since liquid pressure is available underneath the casing 5.

It is not essential that the sprinkler head 8 be rotated continuously in one direction. In the form shown in Figs. 13, 14 and 15, the sprinkler head 8 is shown so arranged that it reverses its direction of rotation after each half or fraction of a revolution.

In this form of the invention, the casing 161 is substituted for casing 5. The sprinkler body 162 corresponds to sprinkler body 8. It is, however, restrained against upward movement, it being the intention, in this form, to raise the whole casing 161 as illustrated in Fig. 16.

The top of the casing 161 is formed by a supplemental threaded extension 163. This extension has a downwardly directed tubular guide 164 and an upper flange 165 in which the sleeve 166 joined to the body 162, can be rotated. In addition to the top internal gear 52, a bevel gear 167 is shown, guided for rotary movement as by its hub 168 inside of the guide 164. This bevel gear is provided with spokes 169 joined to hub 170, which is fastened to the shaft 27. Spokes 169 are mechanically coupled to the sleeve 166, so that rotation of bevel gear 167 in either direction will impart rotation to the sprinkler body 162.

This rotation is effected alternately in opposite directions. One of these directions is secured by a series of gearing. Thus the internal gear 171 (corresponding to gear 52 of Fig. 1) is provided at its upper surface with a mutilated bevel gear 172. This bevel gearing extends for one-half revolution, as indicated most clearly in Fig. 14. As the bevel gear 172 rotates in a counter-clockwise direction, as indicated by arrow 173 of Fig. 14, it carries gear 167 around with it.

Figure 13:
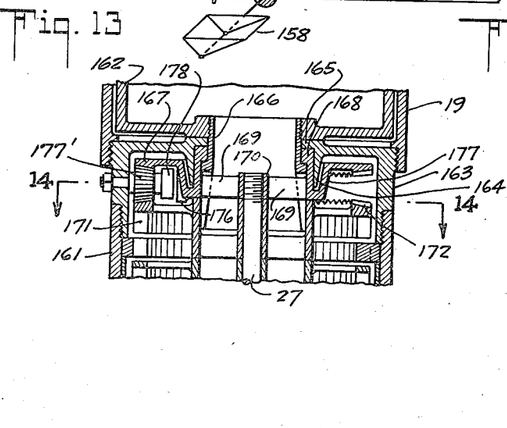
Fig. 13 is a fragmentary sectional view similar to Fig. 1, of a modified form of the invention.

This is accomplished by the aid of a latch 174 pivoted on a pin 175 on gear wheel 172. This latch is urged by gravity to the position indicated in Fig. 15, so that an abutting surface 175' can cooperate with an abutment 176 depending downwardly from the hub 177 of the bevel gear 167. The abutment 176 is shown in Fig. 13 as having been advanced to a point corresponding to the axis of a small bevel pinion 177', and in Fig. 15, the abutment 176 has not yet reached that position.

Figure 14:
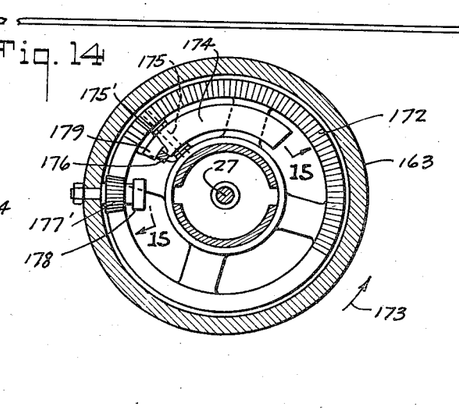
Fig. 14 is a sectional view, taken along the plane 14—14 of Fig. 13.

During that portion of the revolution of mutilated gear 172 during which it is out of mesh with bevel pinion 177', the drive between gear 172 and abutment 176 is effective. However, as soon as mutilated gear 172 is about to enter into engagement with the bevel pinion 177', the latch 174 is depressed out of contact with abutment 176, as by the aid of the stationary collar 178. This stationary collar 178 acts upon a cam surface 179 at the forward end of latch 174, and depresses it at its forward end. In this way, the latch 174 passes underneath the abutment 176. At the same time, bevel pinion 177' is rotated by the mutilated gear 172. This pinion, being in continual mesh with bevel gear 167 serves to drive it in a clockwise direction for a half revolution, corresponding to the angular extent of the mutilated gear 172. At the end of the half revolution, the latch 174 again engages abutment 176, which has been brought back a half revolution in a clockwise direction, by the rotation of gear 167, to a line diametrically opposite to the axis of bevel pinion 177'; that is, at the right hand side of the shaft 27 as viewed in Fig. 14. For the next half revolution, therefore, the movement is again counterclockwise, as illustrated in Fig. 14, until latch 174 is again disengaged by the stationary member 178. The clockwise rotation for a half revolution is then repeated.

The alternate half revolutions continue as long as the sprinkler is active. As before, the sprinkler head 162 can be provided with a depression similar to depression 140 in Fig. 6 to actuate the releasing mechanism once during each half revolution.

I claim:

1. In a sprinkler structure, a rotatable head, and means for imparting a torque to the head, including a nozzle plate, said plate being made in two parts each having a series of through apertures, matching in pairs to define nozzle openings, directed obliquely to the face of the plate, the surfaces of contact of the parts at the apertures being substantially perpendicular to the axes of the nozzles.

2. In an oscillating sprinkler head structure, a rotating mutilated gear, a gear wheel joined to the head, a pinion in meshing relation to both gears, and serving to drive said gear wheel while said pinion is in mesh with the mutilated gear, means to rotate said mutilated gear, and means forming a releasable connection between the gear wheel and the mutilated gear for causing said mutilated gear to drive said gear wheel directly in an opposite direction than when the pinion is in mesh with the mutilated gear.

3. In an oscillating sprinkler head structure, a mutilated bevel gear, a bevel pinion having a stationary axis and in meshing relation to the mutilated gear, a bevel gear wheel in constant meshing relation to said pinion and actuating the sprinkler head, said gear wheels being coaxial, a releasable connection between the two bevel gears, means to rotate said mutilated bevel gear, and means whereby said connection is established only during the period when the pinion is not in mesh with the mutilated gear.

4. The combination as set forth in claim 3, in which the releasable connection includes a weighted catch carried by the bevel gear wheel that drives the head, and normally out of engagement with the mutilated gear, and in which the means whereby the connection is established is a stationary abutment placed in the path of said catch.

5. In combination, a liquid discharge device, means for supplying said device with liquid under pressure, a valve controlling the passage of liquid to the device, means for operating the valve comprising a main fluid pressure cylinder and a piston, there being a passageway connecting said supply means with said cylinder, whereby the liquid pressure of said supply means is effective to keep the valve closed, a control valve for controlling the admission and release of said liquid pressure to and from said cylinder, means for operating the control valve comprising a pull rod adapted to be manually actuated to place the control valve in position to release said liquid pressure from said cylinder, a shoulder on said rod, a latch adapted to engage said shoulder and hold said rod and said valve in said position, means operated by the liquid discharge device to disengage said latch, and means to return the rod and control valve to pressure admitting position.

6. In a sprinkler head structure, a stationary housing having a fluid inlet and a fluid outlet, a hollow head rotatably supported by the housing adjacent said outlet and having an inlet passage as well as a discharge nozzle, means permitting relative limited axial movement between the head and the housing, a nozzle structure supported in the housing and adapted to receive the fluid from the inlet therein, a bucket wheel rotatably supported by the housing above the nozzle and adapted to receive the fluid discharged therefrom, planetary gearing connecting the head and the bucket wheel, including a pinion rotatably mounted on the bucket wheel, an internal gear meshing with the pinion and secured to the housing, a second internal gear of a different number of teeth from the first internal gear also meshing with the pinion and in driving relation with the head, a discharge tube associated with the bucket wheel and adapted to receive the fluid therefrom and pass it to the head, and a driving connection between the tube and the head.

7. In a sprinkler head structure, a stationary housing having a fluid inlet and a fluid outlet, a hollow head rotatably supported by the housing adjacent said outlet and having an inlet passage as well as a discharge nozzle, means permitting relative limited axial movement between the head and the housing, a nozzle structure supported in the housing and adapted to receive the fluid from the inlet therein, a bucket wheel rotatably supported by the housing above the nozzle and adapted to receive the fluid discharged therefrom, planetary gearing by which rotation of the bucket wheel is effective to rotate the head, including a pinion rotatably mounted on the bucket wheel and meshing with a pair of internal gears, one of said internal gears having a different number of teeth from the other of said internal gears, one of said internal gears being secured against rotation, a discharge tube rotatably supported on the bucket wheel and adapted to receive the discharge therefrom, the other of said internal gears being arranged to drive said discharge tube, a tube associated with the inlet of the head and telescoping with said discharge tube, and a driving connection between said tubes.

8. In a sprinkler head structure, a substantial cylindrical housing having a fluid inlet near its lower end, a hollow head coaxially and rotatably supported at the upper end of said housing and having an inlet passage as well as a discharge nozzle, a nozzle structure secured in the housing coaxially therewith and adapted to pass fluid from the inlet upwardly, a bucket wheel rotatably supported coaxially by said nozzle structure, so as to receive the fluid therefrom, planetary gearing by which rotation of the bucket wheel is effective to rotate the head including a pinion carried by the bucket wheel and engaging a pair of internal gears, one of which has a different number of teeth from the other, one of said internal gears being secured to the housing, the other of said internal gears being rotatably supported and having a large hollow hub adapted to form a discharge tube from the bucket wheel, a tube associated with the inlet of the head and in sliding telescopic relationship with said discharge tube, a driving connection between the tubes, and means to limit the axial movement between them.

9. In a device of the character described, a sprinkler head having a hollow body, said body having a restricted liquid inlet, and a tubular nozzle structure extending within the body and transversely to the said inlet, and terminating at such a point within the body as to form a passage for liquid out of the body from a place therein remote from the flow of liquid entering through said inlet.

10. In a device of the character described, a sprinkler head having a hollow body, said body having a tapering restricted liquid inlet, and a tubular nozzle structure extending within the body transversely to the said inlet, and terminating at such a point within the body as to form a liquid passage out of the body from a place in the body that is out of alinement with said inlet.

11. In a device of the character described, a rotary sprinkler head, a water wheel, and reduction gearing connecting the water wheel and the head, said head having an inlet from the wheel, around which inlet said gearing is arranged, and said head and wheel having such cooperating members as to define only narrow passages for the entry of water into the space where the gearing is located.

12. In a device of the character described, a sprinkler head, a valve having a movable closure for controlling the inlet to the head, fluid pressure means for operating said closure, said means having a cylinder chamber and a cover therefor, and a control valve for said fluid pressure means, including a rotary plug valve structure supported on said cover.

13. In a device of the character described, a sprinkler head, a valve having a movable closure for controlling the inlet to the head, fluid pressure means for operating said closure, said means having a cylinder chamber and a cover therefor, and a control valve for said fluid pressure means, including a rotary plug valve structure supported on said cover, and means for rotating said plug valve in opposite directions in response to conditions of head operation.

14. In combination, a sprinkler head having a lower wall, a hollow rotary support for the head, said support extending below the lower wall, and forming an inlet for the head, a water wheel casing having therein a water wheel arranged coaxial with said support, the arrangement being such that the head and support are rotatable relative to the water wheel casing, and means for rotating said head and support by said water wheel, said water wheel having a discharge opening coaxial with said support and leading into the lower end of said support.

PATRICK DE LACY-MULHALL.